United States Patent Office 2,769,270
Patented Nov. 6, 1956

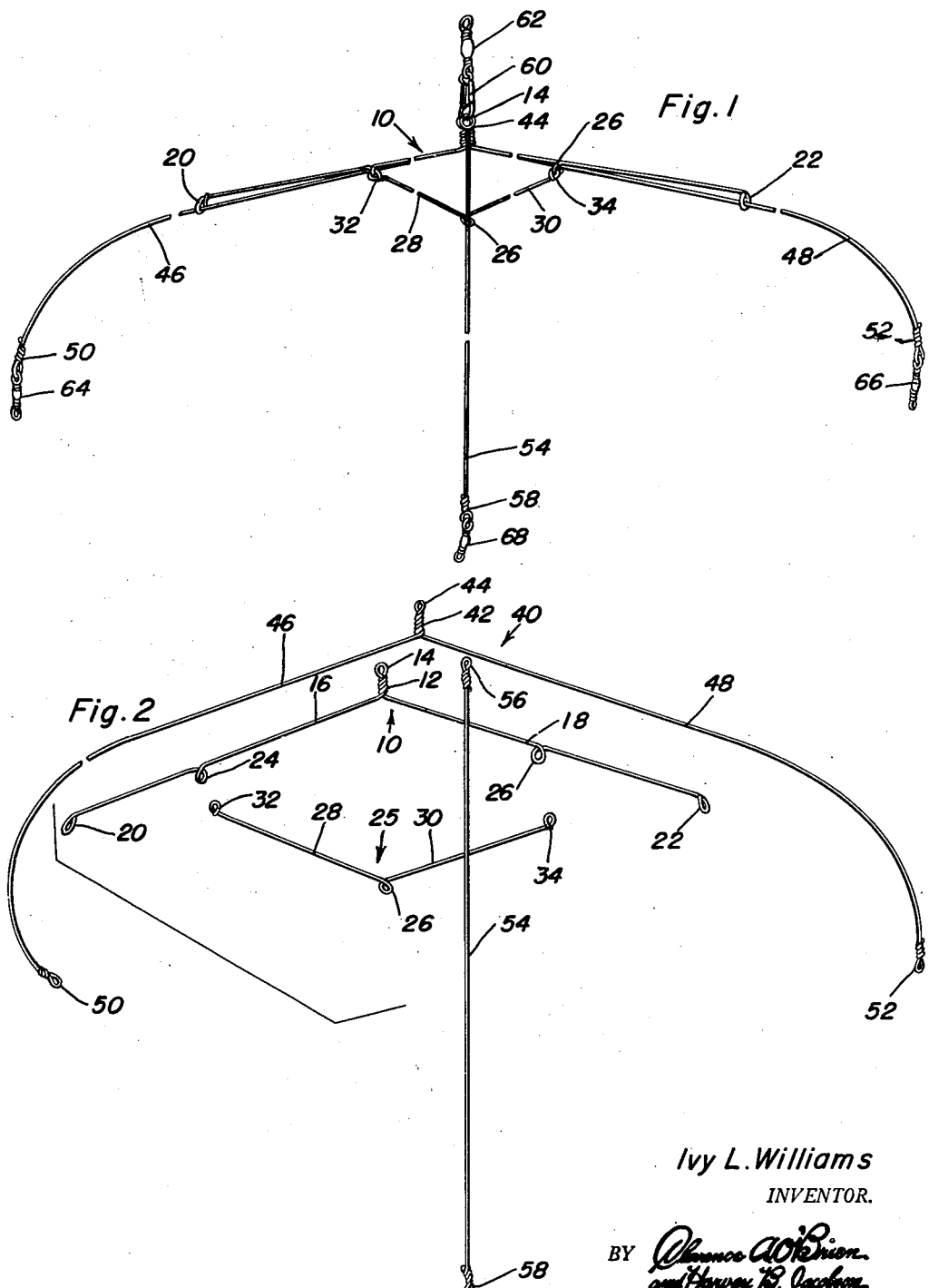

2,769,270

SPREADER FOR FISHHOOKS

Ivy L. Williams, Ty Ty, Ga.

Application July 16, 1954, Serial No. 443,914

1 Claim. (Cl. 43—42.74)

This invention relates to a spreader for fishhooks and particularly to a device for utilizing a leader and a spreader to support a plurality of hooks in spaced apart relation on a single line.

In fishing with hook and line it is customary to use a single hook or at most two or three hooks mounted in series relation on the line with a sinker somewhere at the end of the line to maintain the hooks in bottom contact with the body of water being fished in. Considerable difficulty has been encountered because of a tangling of the hooks with the line and because of the close proximity of the various baits and the lack of control to the various baits, or rather to the hooks carrying the bait. Various types of spreaders have heretofore been suggested in which the fishing line is connected to the spreader and various hooks are mounted on the spreader in order to maintain the hooks in spaced apart untangled relation and usually it is necessary to provide a sinker element for holding the spreader in fixed position. When utilizing hooks mounted on a spreader lack of direct control by the fish line is apparent with the result that fish are frequently lost because of the lack of striking control by the fisherman.

In the construction according to the present invention, a resilient spreader is provided having an eye for direct attachment to the fish line and a leader or leaders are also provided having eyes for connection to the fish line and having the leaders strung through suitable guides or eyelets on the spreader so that the spreader will maintain the leaders in spaced apart relation but with the leaders directly connected to the fish line so that the control of the hooks will not be lost.

It is accordingly an object of the invention to provide an improved spreader for fishing hooks.

It is a further object of the invention to provide a spreader operative to spread apart hooks which are directly connected to the fish line.

It is a further object of the invention to provide a spreader operative to locate a plurality of leaders in diverging directions.

Other objects and many of the attendant advantages of the present invention will be apparent from the following detailed description taken in conjunction with the accompanying drawing in which:

Figure 1 is a front elevation of the spreader leader combination according to the invention; and Figure 2 is an exploded perspective view of the fishing device according to the invention.

In the exemplary embodiment according to the invention, a spreader member indicated generally at 10 is constructed of resilient relatively stiff wire-like material preferably spring steel wire and is twisted adjacent the central portion thereof as at 12 to provide an eye 14.

Twisting of the member 10 adjacent the central portion thereof provides a pair of diverging arms 16 and 18 which preferably extend in a somewhat angular relation to each other and the arms 16 and 18 are provided with free outer end and terminal eyes 20 and 22, respectively. Guide and retaining eyes 24 and 26 are provided intermediate the ends 20 and 22, respectively, and the line swivel attaching eye 14.

A relatively short complemental brace member indicated generally at 25 is provided of similar resilient wire-like material and is twisted adjacent the middle portion thereof to provide a line guide 26 and having divergent arms 28 and 30. Terminal connecting loops 32 and 34 are provided adjacent the ends of the arms 28 and 30, respectively, and are engageable with the guides 24 and 26 to provide a stiffening brace member to maintain the arm 16 and 18 in the desired angular diverging relation.

A leader member 40 which may be constructed of similar spring steel wire, nylon, or the like, is preferably twisted as at 42 to provide an eyelet 44 adjacent the central portion of the leader so that the ends 46 and 48 may be provided with suitable eyes 50 and 52 for the reception of fishhooks, not shown. The leader 40 will be assembled with the spreader member 10 by extending the end 46 through the guide 24 and the eyelet 20 and the end 48 through the guide 26 and the eye 22. An auxiliary leader 54 will be provided with an attaching eyelet 56 and an eyelet 58 for the attachment of a fishhook or another spreader such as the spreader 10 and leader 54 will be extended through the guide member 26 with the eyelet 56 arranged in juxtaposition to the eyelet 14 and 44. In order to properly attach all of the equipment to the fish line, not shown, and attaching snap 60 will be threaded through the eyelets 14, 44 and 56 so that all of the elements will be directly connected to the line through a swivel 62.

In the operation of the fishing device according to the invention, any suitable leader, as 40, will be provided with the intermediate eye 44 and extended through the guides 24 and 26 and the eyelets 20 and 22 so that the external ends of the leaders will be maintained in spaced apart relation and the entire structure will be promptly connected to the fishing line by means of the snap 60 which in connection with the swivel 62 will prevent entanglement of the line or twisting thereof by any impediments met by the spreader.

The fishhooks may be directly connected to the eyes 50 and 52 or connected thereto by means of suitable swivels 64 and 66. Likewise a hook may be directly connected to the leader 54 by connecting it to the eye 58 but preferably by means of a swivel 68.

Instead of connecting a hook to the leader 54 it is entirely possible to connect another spreader 10 thereto and provide a second series of spread apart fishhooks in the same manner as was accomplished by the first spreader 10.

It will thus be apparent that by use of the present invention it will be possible to distribute a plurality of fishhooks on the bottom of the body of water being fished with the fishhooks being spaced apart and maintained stiffly separated so that they will not be entangled with each other or with the line during casting or fishing operations.

It will be apparent to those skilled in the art that various changes and modifications may be made in the construction and arrangements of the parts thereof without departing from the true spirit and scope of the invention.

What is claimed as new is as follows:

A fishing device comprising a resilient spreader member, an eye formed substantially centrally of said spreader member, said spreader member including arms diverging from said eye, and eyes disposed adjacent the outer ends of said diverging arms, a guide loop on each arm and disposed intermediate the end eye and said central eye, a leader including a substantially centrally disposed eye, and having portions on opposite sides of said central eye extending along the arms of said spreader member and extending through the respective guide loops and end eyes of said spreader member, said portions terminating in means adapted for connection thereto of fish hooks the central eyes of said spreader member and said leader being positionable in overlying relation and adapted for connection to a fish line, an angulated resilient brace connected between the guide loops and the divergent arms, said brace having a guide loop disposed substantially centrally thereof in substantially vertical alignment with said central eye, a leader extending through the guide loop of said brace, said last mentioned leader having an eye positionable adjacent said central eyes adapted to be connected to said fish line.

References Cited in the file of this patent

UNITED STATES PATENTS

| | | |
|---|---|---|
| 790,336 | Yoerger | May 23, 1905 |
| 1,123,636 | Weisenfeld | Jan. 5, 1915 |
| 1,464,163 | Abernethy | Aug. 7, 1923 |
| 2,492,638 | Hickson | Dec. 27, 1949 |

FOREIGN PATENTS

| | | |
|---|---|---|
| 67,128 | Norway | Nov. 29, 1943 |